United States Patent [19]

Sugimura et al.

[11] Patent Number: 5,414,055
[45] Date of Patent: May 9, 1995

[54] COATING RESIN COMPOSITIONS

[75] Inventors: Yoh Sugimura, Odawara; Motoshi Yabuta, Hadano; Yoshiyuki Yukawa, Hiratsuka; Yasuhiro Fujii, Kanagawa, all of Japan

[73] Assignee: Kansai Paint Company, Limited, Amagasaki, Japan

[21] Appl. No.: 64,650

[22] Filed: May 21, 1993

[30] Foreign Application Priority Data

May 28, 1992 [JP] Japan ................... 4-137027

[51] Int. Cl.$^6$ .......................................... C08F 283/04
[52] U.S. Cl. ...................... 523/453; 525/77; 525/123; 525/124; 525/328.2; 525/374; 525/383
[58] Field of Search ............. 525/77, 123, 124, 328.2, 525/374, 383, 453; 523/521

[56] References Cited

U.S. PATENT DOCUMENTS 5,116,930  5/1992  Yabuta et al. .................. 528/45
5,124,399  6/1992  Yabuta et al. .................. 524/555

*Primary Examiner*—Paul R. Michl
*Assistant Examiner*—U. K. Rajguru
*Attorney, Agent, or Firm*—Armstrong, Westerman, Hattori, McLeland & Naughton

[57] ABSTRACT (1) A coating resin composition consisting essentially of a self-crosslinking resin (I) having at least one hydroxyl group and at least one blocked isocyanate group in the molecule wherein the resin (I) is prepared by reacting some of the free isocyanate groups of a vinyl polymer (A) having at least two free isocyanate groups in the molecule with some of the hydroxyl groups of a polyolefin resin (B) having at least two hydroxyl groups in the molecule, and subsequently reacting a blocking agent with the remaining free isocyanate groups, and (2) a coating resin composition consisting essentially of a self-crosslinking resin (II) having at least one hydroxyl group and at least one blocked isocyanate group in the molecule wherein the resin (II) is prepared by reacting all free isocyanate groups of a vinyl polymer (C) having at least one free isocyanate group and at least one blocked isocyanate group in the molecule with some of the hydroxyl groups of a polyolefin resin (B) having at least two hydroxyl groups in the molecule.

10 Claims, No Drawings

COATING RESIN COMPOSITIONS

The present invention relates to novel coating resin compositions consisting primarily of a self-crosslinking resin having within the molecule a blocked isocyanate group and a hydroxyl group which are complementary reactive groups, the compositions being especially excellent in adhesion to plastic materials.

Plastic materials are used in place of metals partly in the outer panels of motor vehicles to make the vehicle bodies lightweight and easy to design. This tendency has become more pronounced in recent years. While a wide variety of materials are used for this purpose, the problem of global environmental pollution has led to the need of resource recycling and wider use of thermoplastic resins which are reusable. When thermoplastic resins are to be coated, it is necessary to use coating compositions which are curable by crosslinking at a temperature lower than the thermal deformation temperature of the plastic material (usually lower than 120° C.) because the material deforms at higher temperatures.

Conventionally, such plastic materials requiring low-temperature baking are generally coated with two-pack coating compositions consisting essentially of an acryl polyol or polyester polyol, and a polyisocyanate compound. Although excellent in resistance to chemicals, physical properties, weather resistance, etc., these coating compositions have the drawback of being inconvenient to handle and presenting difficulty in washing the device used for coating since they are of the two-pack type. Also available are single-pack coating compositions which comprise like components and in which the polyisocyanate compound is used as blocked. These compositions are free of the drawback of the two-pack compositions but are difficult to use for plastic materials which need low-temperature baking because the blocking agent has a high dissociation temperature (generally at least 150° C.). With the single-pack composition, moreover, the acryl polyol or polyester polyol is not fully compatible with the blocked isocyanate compound, and when the coating formed is observed microscopically, the surface layer and the inner layer differ in composition. The composition is therefore still unsatisfactory in curability, and the gloss and surface smoothness of the resulting coating.

Also known is a self-crosslinking resin having a hydroxyl group, and an isocyanate group or blocked isocyanate group in the molecule (Unexamined Japanese Patent Publication No. 186722/1988). This resin is prepared by copolymerizing an isocyanate-containing polymerizable monomer or a blocked isocyanate-containing polymerizable monomer with a hydroxyl-containing polymerizable monomer. In the case where the isocyanate group containing polymerizable monomer is used, it is difficult to prevent the reaction of the isocyanate group with the hydroxyl group even if the copolymerization reaction is conducted at the lowest possible temperature, and gelation is liable to occur during the reaction. From the viewpoint of initiators, the reaction of the publication wherein the isocyanate containing monomer is an α-methylstyrene derivative fails to achieve a high polymerization conversion in the presence of an azo initiator, or needs to be carried out at not lower than 100° C. to attain a high conversion if a peroxide or carbonate initiator is used, and is therefore effect without gelation.

On the other hand, the polymerization reaction can be conducted almost without gelation when the blocked isocyanate-containing polymerizable monomer is used. However, if the isocyanate of the monomer used is a group blocked with a phenolic or oxime blocking agent, the polymerization reaction must be conducted at a relatively high temperature (120°-140° C.) and consequently has the drawback of giving a colored product. The blocking agents other than these have a higher dissociation temperature, presenting difficulty in giving a self-crosslinking resin which is curable at a low temperature.

An object of the present invention is to provide a coating resin composition comprising a self-crosslinking resin which can be prepared by a reaction free of gelation, color development and a reduction in polymerization conversion.

Another object of the invention is to provide a single-pack coating resin composition which consists essentially of a self-crosslinking resin having complementary groups, i.e., a blocked isocyanate group and a hydroxyl group, in the molecule and which is at least comparable to conventional two-pack coating compositions in properties, easy to handle and apply without cumbersomeness, curable at a low temperature and satisfactory in adhesion to plastic materials.

These and other objects of the invention will become more apparent from the following description.

The present invention provides:
(1) a coating resin composition consisting essentially of a self-crosslinking resin (I) having at least one hydroxyl group and at least one blocked isocyanate group in the molecule and characterized in that the resin (I) is prepared by reacting some of the free isocyanate groups of a vinyl polymer (A), having at least two free isocyanate groups in the molecule with some of the hydroxyl groups of a polyolefin resin (B), having at least two hydroxyl groups in the molecule, and subsequently reacting a blocking agent with the remaining free isocyanate groups, and (2) a coating resin composition consisting essentially of at least one self-crosslinking resin (II) having at least one hydroxyl group and at least one blocked isocyanate group in the molecule and characterized in that the resin (II) is prepared by reacting all free isocyanate groups of a vinyl polymer (C) having at least one free isocyanate group and at least one blocked isocyanate group in the molecule with some of the hydroxyl groups of a polyolefin resin (B), having at least two hydroxyl groups in the molecule.

The self-crosslinking resins (I) and (II) for use in the present invention will be described in greater detail.

The self-crosslinking resin (I) is a resin prepared by reacting some of the free isocyanate groups of a vinyl polymer (A), having at least two free isocyanate groups in the molecule with some of the hydroxyl groups of a polyolefin resin (B), having at least two hydroxyl groups in the molecule, and subsequently reacting a blocking agent with the remaining free isocyanate groups.

Stated more specifically, the vinyl polymer (A), which has at least two free isocyanate groups in the molecule, is a polymer consisting essentially of an isocyanate-containing vinyl monomer (hereinafter referred to as the "NCO-containing monomer"), and further comprising other vinyl monomer when required. The polymer is mainly a straight-chain polymer having terminal and/or side chain free isocyante groups.

The NCO-containing monomer is a compound having at least one unblocked isocyante group and at least one radically polymerizable double bond in the molecule. Examples of such compounds are methacryloyl isocyanate, 2-isocyanate ethyl methacrylate, m- or p-isopropenyl-α,α'-dimethylbenzyl isocyanate and addition product of a hydroxyl-containing vinyl monomer with a diisocyanate compound in the mole ratio of 1:1. One or at least two of these compounds are usable.

The hydroxyl-containing vinyl monomer for use in preparing the NCO-containing monomer is a compound having at least one hydroxyl group and at least one radically polymerizable double bond in the molecule. Exemplary of such compounds are 2-hydroxyethyl (meth)acrylate, 2-hydroxypropyl (meth)acrylate, hydroxybutyl acrylate, 2,3-dihydroxypropyl acrylate, 2-hydroxy-3'-phenoxyethyl acrylate, 2-hydroxy-3-ethoxyethyl acrylate and the like. Also usable is an equimolar adduct of acrylic acid or methacrylic acid with a glycol (having 2 to 20 carbon atoms).

The diisocyanate compound to be used for preparing the NCO-containing monomer is a compound having two isocyanate groups in the molecules. Examples of such compounds are aliphatic, aromatic and alicyclic diisocyanate compounds including tolylene diisocyanate, 4,4'-diphenylmethane diisocyanate, xylylene diisocyanate, hexamethylene diisocyanate, lysine diisocyanate, 4,4'-methylenebis(cyclohexyl isocyanate), methylcyclohexane-2,4(2,6)-diisocyanate, isophorone diisocyanate and trimethylhexane diisocyanate.

Preferable among these NCO-containing monomers are 2-isocyanate ethyl methacrylate, m-isopropenyl-α,α'-dimethylbenzyl isocyanate and equimolar adduct of 2-hydroxyethyl acrylate with isophorone diisocyanate.

The vinyl polymer (A) is obtained by polymerizing such an NCO-containing monomer only, or copolymerizing the monomer with other vinyl monomer.

Although the NCO-containing monomer to be used can be one of the above examples, it is especially desirable to use m-isopropenyl-α,α'-dimethylbenzyl isocyanate having a tertiary isocyanate group from the viewpoint of preventing gelation in the reaction of the polymer (A) with the hydroxyl-containing polyolefin resin (B) to be described below.

The other vinyl monomer is preferably a compound having a radically polymerizable double bond in the molecule but not having an isocyanate group or active hydrogen reactive with the isocyanate group. Examples of such compounds are styrene, α-methylstyrene, vinyltoluene and like aromatic vinylmonomers; methyl (meth)acrylate, ethyl (meth)acrylate, butyl (meth)acrylate, 2-ethylhexyl (meth)acrylate, lauryl (meth)acrylate, tridecyl (meth)acrylate, stearyl (meth)acrylate, cyclohexyl (meth)acrylate, benzyl (meth)acrylate and like (meth)acrylic acid esters; Viscose 3F (brand name, product of OSAKA ORGANIC CHEMICAL INDUSTRY LTD., the same as hereinafter), Viscose 3MF, 8F and 8MF, perfluorocyclohexyl (meth)acrylate, N-2-propylperfluorooctanesulfonic acid amide ethyl (meth)acrylate, vinyl fluoride, vinylidene fluoride and like fluorine-containing vinyl monomers; N,N'-dimethylaminoethyl (meth)acrylate, N,N'-diethylaminomethyl (meth)acrylate, N,N'-diethylaminoethyl (meth)acrylate, N,N'-diethyl (meth)acrylamide and like nitrogen-containing vinyl monomers; vinyl ethyl ether, vinyl butyl ether and like vinyl ether monomers; and glycidyl (meth)acrylate, 3,4-epoxycyclohexylmethyl (meth)acrylate, arylglycidyl ether, alkyletherified methylol acrylamide, (meth)acrylamide, (meth)acrylic acid chloride, vinyl chloride, vinylidene chloride, (meth)acrylonitrile, γ-methacryloxyalkyltrimethoxysilane, etc. These compounds are used singly or at least two of them are used in admixture.

The ratio of the NCO-containing monomer to the other vinyl monomer is not limited specifically insofar as the resulting polymer (A) has at least two free isocyanate groups in the molecule. The ratio of NCO-containing monomer/other vinyl monomer (by weight) is suitably 100/0 to 1/99, preferably 65/35 to 30/70.

The polymerization reaction of the NCO-containing monomer only or of this monomer with other vinyl monomer is usually conducted preferably in an inert organic solvent free from active hydrogen reactive with isocyanate groups. Examples of useful inert organic solvents are hexane, heptane, octane and like aliphatic hydrocarbons, benzene, toluene, xylene and like aromatic hydrocarbons, esters, ketones, etc. These solvents are used singly or in admixture. These solvents are likely to contain water, which is therefore preferably removed before use as required.

The polymerization reaction is conducted usually at a temperature of 50° to 180° C. in the presence of a radical polymerization initiator. The molecular weight of the polymer (A) is adjustable, for example, by varying the concentration of the reaction system or the amount of initiator. The concentration of the reaction system is in the range of 20 to 80 wt. % calculated as the polymer.

Examples of useful radical polymerization initiators are benzoyl peroxide, lauroyl peroxide, caproyl peroxide, tert-butyl peroctoate, diacetyl peroxide and like organic peroxides; 2,2'-azobisisobutyronitrile, azobis 2,4-dimethylvaleronitrile, dimethyl-2,2'-azoisobutyrate and like azo catalysts; diisopropylperoxy carbonate, tert-butylperoxyisopropyl carbonate and like dialkylperoxy dicarbonate; and redox initiators.

To achieve an improved polymerization conversion, it is especially desirable to use a peroxide or carbonate initiator and conduct the reaction at a temperature of at least 100° C. It is more preferable to use an acrylate monomer in combination with the above monomer or monomers, whereby the polymer can be obtained with ease at a higher polymerization conversion. Although the initiator is usable at a concentration of 0.01 to 15 wt. % based on the whole amount of monomer or monomers, the concentration is preferably in the range of 0.1 to 10 wt. %.

For the polymerization, an electron beam, ultraviolet rays or the like can be used alternatively instead of the polymerization initiator.

Besides radical polymerization, ion polymerization or group transfer polymerization can be resorted to.

The polymer (A) for use in the present invention is preferably 500 to 50000, more preferably 1500 to 30000, in weight average molecular weight. To be suitable, the polymer is 30 to 200 g/1000 g polymer in isocyanate value.

The polymer (A), which has at least two free isocyanate groups in the molecule, is preferably free from any active hydrogen reactive with the isocyanate groups.

The polyolefin resin (B) is a resin having at least two hydroxyl groups in the molecule. The resin (B) is obtained, for example, by graft-polymerizing a monomer component containing a hydroxyl-containing polymerizable monomer with a polyolefin resin. The polyolefin resin to be used is, for example, a polymer comprising at least one olefin monomer having 2 to 5 carbon atoms, such as one selected from among ethylene, propylene and butylene, or copolymer of such an olefin monomer and other monomer polymerizable therewith. The other polymerizable monomer is a monomer which has at least one polymerizable double bond in the molecule and which may further contain an active hydrogen-containing functional group reactive with an isocyanate group. Useful polyolefin resins (B) include a chlorinated or maleinized polyolefin resin. Such a resin is desirable since chlorination affords improved compatibility with other resins or maleinization gives higher adhesion with plastic materials. The maleinized resin is a product obtained by adding maleic acid or anhydride to a polyolefin resin.

The monomer component to be graft-polymerized with the polyolefin resin consists essentially of a hydroxyl-containing polymerizable monomer, and can be a mixture of this monomer and other polymerizable monomer, but is free from the NCO-containing monomer.

The hydroxyl-containing polymerizable monomer is a compound having at least one hydroxyl group and at least one polymerizable double bond in the molecule. Examples of such monomers are 2-hydroxyethyl (meth)acrylate, 2-hydroxypropyl (meth)acrylate, hydroxybutyl (meth)acrylate, 2,3-dihydroxypropyl (meth)acrylate, 2-hydroxy-3-phenoxyethyl acrylate, 2-hydroxy-3-ethoxy-ethyl acrylate, etc. Also useful are equimolar adducts of acrylic acid or methacrylic acid with a glycol (with 2 to 20 carbon atoms), caprolactone-modified (meth)acrylates such as Placcel FM-1 (brand name, product of DAICEL CHEMICAL INDUSTRIES LTD., the same as hereinafter), Placcel FM-2, FM-3, FM-4, FM-5, FA-1, FA-2, FA-3, FA-4 and FA-5, etc.

The other polymerizable monomer is one copolymerizable with the hydroxyl-containing polymerizable monomer and is preferably a compound having a polymerizable double bond in the molecule and not having active hydrogen reactive with the isocyanate group. Preferred examples of such monomers are other vinyl monomers mentioned for the vinyl polymer (A). Also copolymerizable as required are carboxyl-containing polymerizable monomers or polymerizable monomers containing a carboxylic anhydride group, such as acrylic acid, methacrylic acid, crotonic acid, maleic acid, maleic anhydride, itaconic acid, itaconic anhydride, fumaric acid, citraconic acid and like $\alpha,\beta$-ethylenically unsaturated carboxylic acids.

The monomer component containing a hydroxyl-containing polymerizable monomer can be graft-polymerized with the polyolefin resin by a known method such as chain transfer method, hydrogen abstracting reaction method or radiation grafting method.

The weight average molecular weight of the polyolefin resin before graft polymerization is not limited specifically but is suitably about 1000 to about 100000, more suitably 3000 to 50000. The proportions of polyolefin resin and monomer component to be subjected to graft polymerization, which are determined as desired according to the purpose, are preferably 15 to 60 wt. %, more preferably 30 to 50 wt. %, of polyolefin resin, and 40 to 85 wt. %, more preferably 50 to 70 wt. %, of monomer component based on the combined weight of the two reactants. The weight average molecular weight of the polyolefin resin (B) resulting from graft polymerization, although not limited specifically, is about 1500 to about 200000, preferably 5000 to 60000, to be suitable. The resin (B) is about 20 to about 200 mg KOH/g resin in hydroxyl value to be suitable.

The self-crosslinking resin (I) of the present invention is prepared by reacting some of the free isocyanate groups of the vinyl polymer (A) having at least two free isocyanate groups in the molecule with some of the hydroxyl groups of the polyolefin resin (B) having at least two hydroxyl groups in the molecule, and subsequently reacting a blocking agent with the remaining free isocyanate groups.

The reaction between the vinyl polymer (A) and the hydroxyl-containing polyolefin resin (B) for preparing the self-crosslinking resin (I) is a urethanation reaction between the isocyanate group and the hydroxyl group. Stated more specifically, the urethanation reaction is conducted by admixing the hydroxyl-containing polyolefin resin (B) with an organic solvent solution of the vinyl polymer (A) and heating the mixture usually at a temperature of 20° to 100° C., preferably 25° to 60° C. The reaction is controlled with reference to the reduction in the amount of isocyanate groups, i.e., isocyanate value. To prevent gelation during this reaction, the polymer (A) is preferably one prepared with use of an NCO-containing monomer having a tertiary isocyanate group. When required, tin or like catalyst may be used for this reaction. The amount of hydroxyl-containing polyolefin resin (B) to be admixed with the vinyl polymer (A) is such that the vinyl polymer (A), when having a weight average molecular weight of 500 to 50000, can be given an average of at least 0.1 urethane bond as introduced therein per molecule. The number of urethane bonds to be introduced into the vinyl polymer (A) is preferably 0.5 to 1.5, most preferably 1, per molecule when the polymer has a weight average molecular weight of 500 to 30000.

Thus, the vinyl polymer (A) has the hydroxyl-containing polyolefin resin (B) added thereto and urethane bonds introduced therein by the reaction of the resin (B) with the polymer (A). The free isocyanate groups remaining in the vinyl polymer (A) are then reacted with a blocking agent and thereby completely blocked to obtain the self-crosslinking resin (I). Examples of useful blocking agents are phenol, cresol, xylenol, p-ethylphenol, o-isopropylphenol, p-tert-butylphenol, p-tert-octylphenol, thymol, p-naphthol, p-nitrophenol, p-chlorophenol and like phenols; methanol, ethanol, propanol, butanol, methyl cellosolve, butyl cellosolve, methyl carbitol, benzyl alcohol, phenyl cellosolve, furfuryl alcohol, cyclohexanol and like alcohols; dimethyl malonate, ethyl acetoacetate and like active methylene compounds; butyl mercaptan, thiophenol, tert-dodecyl mercaptan and like mercaptans; acetanilide, acetanisidide, acetamide, benzamide and like acid amides; succinimide, maleimide and like imides; diphenylamine, phenylnaphthylamine, aniline, carbazole and like amines; imidazole, 2-ethylimidazole and like imidazoles; urea, thiourea, ethyleneurea and like ureas; phenyl N-phenylcarbamate, 2-oxazolidone and like carbamic acid salts; ethyleneimine and like imines; formaldoxime, acetaldoxime, acetoxime, methyl ethyl ketoxime, methyl isobutyl ketoxime, cyclohexanoneoxime and like oximes; sodium bisulfite, potassium bisulfite and like sulfites; $\epsilon$-caprolactam, $\delta$-valerolactam, $\gamma$-butyrolactam, $\beta$-propiolactam and like lactams; etc. Especially preferable among these examples are phenol, lactam, alcohol and oxime blocking agents, while oxime blocking agents are most preferable in the case where baking at a low temperature (up to 120° C.) is required.

As a rule, it is desirable to use the blocking agent in an amount necessary to react with all the remaining free isocyanate groups.

The reaction between the blocking agent and the polymer (A) having the hydroxyl-containing polyolefin resin (B) added thereto is conducted usually at a temperature of 20° to 100° C. When required, a tin catalyst or the like may be used.

The self-crosslinking resin (II) has at least one blocked isocyanate group and at least one hydroxyl group in the molecule and is prepared by reacting all free isocyanate groups of a vinyl polymer (C) having at least one free isocyanate group and at least one blocked isocyanate group in the molecule with some of the hydroxyl groups of the polyolefin resin (B) having at least two hydroxyl groups in the molecule.

More specifically, the vinyl polymer (C), which has at least one free isocyanate group and at least one blocked isocyanate group in the molecule, is obtained by reacting a blocking agent with some of the free isocyanate groups in the vinyl polymer (A).

The blocking agent is admixed with the polymer (A) in an amount required to allow free isocyanate groups to remain in the polymer in such an amount that the subsequent reaction with the hydroxyl-containing polyolefin resin (B) will introduce approximately the same amount of urethane bonds into the polymer (A) as in the case of the self-crosslinking resin (I). It is especially desirable to use and react the blocking agent in an amount which allows free isocyanate groups to remain in such an amount that one urethane bond can be introduced into the polymer (A) per molecule thereof and which is needed to completely block the other free isocyanate groups.

Some of the hydroxyl groups in the hydroxyl-containing polyolefin resin (B) are then reacted with all the remaining free isocyanate groups in the polymer (C) which is prepared by reacting the blocking agent with the polymer (A), whereby the self-crosslinking resin (II) is obtained. Thus, it is required that the amount of hydroxyl groups in the resin (B) be larger than that of remaining free isocyanate groups.

The reaction of the blocking agent with the polymer (A) and the reaction of the resin (B) with the polymer (C) for preparing the self-crosslinking resin (II) are carried out in the same manner as those already described for the self-crosslinking resin (I).

With the self-crosslinking resins (I) and (II) of the present invention, the blocked isocyanate-containing resin molecule and the hydroxyl-containing polyolefin resin molecule are linked by a urethane bond formed by the reaction of the isocyanate group with the hydroxyl group. Accordingly, these resins are graft polymers of both resin molecules.

The self-crosslinking resins thus obtained have at least one blocked isocyanate group and at least one hydroxyl group, and are preferably about 1000 to about 120000, more preferably about 5000 to about 50000, in weight average molecular weight.

When the self-crosslinking resins of the invention are adapted to have equal amounts of blocked isocyanate and hydroxyl in the molecule, these resins produce self-crosslinking coatings having the highest degree of crosslinking. For use in coating compositions, however, it is desired that either one of the functional groups be present in excess in view of adhesion to substrates and adjoining layers. To be suitable, the resins are about 25 to about 250 in hydroxyl value (mg KOH/g resin) and about 5 to about 250 in isocyanate value (g/1000 g resin).

The term "isocyanate value" as used herein refers to the content of free isocyanate groups in the resin. However, with resins having blocked isocyanate groups, these isocyanate groups are taken as unblocked in determining the isocyanate value.

The self-crosslinking resins of the invention can be dissolved or dispersed in organic solvents for use in coating resin compositions. It is suitable that the coating resin composition have a solids content of about 30 to about 70% by weight.

When the present resin is to be used for coating compositions, coloring pigments, metallic pigments, fillers, curing catalysts, surface additives, deterioration preventing agents, etc. are added to the resin as required to prepare a single-pack coating composition for use. Also usable with the present resin are other ingredients including polyols, reactive diluents and other crosslinking agents (e.g., melamine resins, blocked isocyanate compounds, epoxy resins, organic acids, inorganic acids, alkoxysilane compounds, etc.).

Examples of useful curing catalysts are tetraisopropyl titanate, tetrabutyl titanate, lithium acetate, iron (III) acetylacetonate, zinc 2-ethylhexonate, copper acetate, vanadium trichloride, tin octylate, dibutyltin diacetate, dibutyltin dioctoate, dibutyltin dilarurate, dibutyltin dimaleate, tetrabutyltin, dibutyltin oxide, tetra-n-butyl-1,3-diacetyloxydistannoxane, tetra-n-propyl-1,3-diacetyloxydistannoxane, tetra-n-butyl-1,3-dilauryloxydistannoxane and like organic metal catalysts. These organic metal catalysts may be used singly, or at least two of them are usable in admixture. Also preferably usable are tertiary amines such as trimethylamine, triethylamine, dimethlylcyclohexylamine, N-tetramethylhexane-1,6-diamine, N-pentamethyldiethylenetriamine and 2-methyl-1,4-diazabicyclo[2,2,2] octane. Especially preferable are tin octylate, dibutyltin diacetate, dibutyltin dilaurate, distannoxanes and like organotin compounds. Dibutyltin diacetate is suitable to use in the case where baking at low temperatures is required. The amount of curing catalyst to be used is usually about 0 to about 5 wt. % although variable depending on the kind thereof.

When the coating composition or the like comprising such ingredients is heated at a temperature of 60° to 180° C., preferably 80° to 140° C., isocyanate groups are regenerated from the blocked isocyanate groups in the presence or absence of the curing catalyst and react with hydroxyl groups, forming urethane bonds to give a three-dimensional crosslinked structure.

The present invention provides the following advantages.

(1) The self-crosslinking resins of the invention having both of a blocked isocyanate group and a hydroxyl group are used to give single-pack coating compositions. This completely eliminates the cumbersome procedure required, for example, of conventional thermally curable polyurethane coating compositions of the two-pack type, i.e., the procedure of measuring out specified amounts of two liquids immediately before use, mixing the liquids and applying the mixture within a period of time (pot life) during which it remains fully flowable.

(2) Since there is no need to use polymerizable monomers or solvents having active hydrogen in the NCO-containing monomer polymerization reaction system, the polymer (A) can be prepared without involving any gelation.

(3) In reacting the blocking agent with the polymer (A) to obtain the polymer (C), the reaction system is heated at a particular optimum temperature necessary for the blocking agent to react with isocyanate groups, so that blocking agents, such as phenol or oxime compounds, which are prone to coloration at high temperatures are usable for blocking at a temperature of up to about 80° C. without necessitating heating to a high temperature and without containing any likelihood of color development. Moreover, the blocking agent used is low in dissociation temperature (up to 100° C.) and is therefore advantageous for preparing compositions which are curable at low temperatures. Even if having a high dissociation temperature, the blocking agent can be reacted with the polymer (A) with ease free of any gelation.

(4) Since the polymer (A), the hydroxyl-containing polyolefin resin (B) and the polymer (C) are individually prepared before the resin (I) or (II) is prepared, the molecular weight and the number of functional groups of the desired resin can be determined readily.

(5) The self-crosslinking resins of the invention can be easily prepared by polymerization and grafting free of gelation and color development or like objection, and can further be made curable at a low temperature.

(6) The coating resin composition consisting essentially of the self-crosslinking resin of the present invention is well-suited as a single-pack coating composition, is free of all the inherent drawbacks of two-pack coating compositions and yet gives coatings which are at least comparable in properties to those of conventional two-pack coating compositions.

(7) It is especially to be noted that the composition of the invention exhibits high adhesion to plastic materials. The present composition is directly applicable, for example, to nylon, poly-phenylene oxide, alloy compounds of polyphenylene oxide and nylon or ABS, urethane resin, vinyl chloride resin, polypropylene and like nonpolar plastics without using a primer or the like to form coatings which are excellent in adhesion and satisfactory in resistance to chemicals, physical properties, weather resistance, etc. and which can be cured by crosslinking in a wide temperature range of 60° to 180° C. The composition of the invention is therefore usable for single-coat finishing.

The present invention will be described in greater detail with reference to the following examples, which nevertheless in no way limit the invention. The parts and percentages in the examples and comparative examples are all by weight.

EXAMPLE 1

(1) Preparation of vinyl polymer (A-1)

Xylene (65 parts) was placed into a reactor equipped with a stirrer, reflux condenser and thermometer, and was maintained at 130° C. by heating. The following mixture 1 was added dropwise to the xylene over a period of 3 hours. Subsequently, a mixture of 35 parts of xylene and 1.0 part of t-butylperoxyisopropyl carbonate was added dropwise to the resulting mixture over a period of 1 hour, followed by aging for 3 hours to obtain a vinyl polymer (A-1). The polymer had a solids content of 50%, was a colorless transparent liquid and had a Gardner viscosity (as measured by a Gardner bubble viscometer at 25° C., the same as hereinafter) of F, weight average molecular weight of about 9000 and isocyanate value of 80 g/1000 g resin.

| Mixture 1 | |
| --- | --- |
| m-Isopropenyl-α,α'-dimethylbenzyl isocyanate | 40 parts |
| Styrene | 20 parts |
| Ethyl acrylate | 35 parts |
| Methyl methacrylate | 5 parts |
| tert-Butylperoxyisopropyl carbonate | 3 parts |

(2) Hydroxyl-containing polyolefin resin (B-1)

Used as this resin was "40% Acrydick BL-981" (brand name, product of DAINIPPON INK & CHEMICALS INC., hydroxyl value 22.5 mg KOH/g resin, weight average molecular weight about 20000, solids content 40%) which is prepared by graft-polymerizing an acrylic monomer component comprising a hydroxyl-containing polymerizable monomer with a chlorinated polyolefin resin.

(3) Preparation of self-crosslinking resin (I-(1))

Into a reactor equipped with a stirrer, reflux condenser and thermometer were placed 200 parts of the vinyl polymer (A-1) and 1187.5 parts of the hydroxyl-containing polyolefin resin (B-1), which were then stirred at room temperature (25° C.) for 15 minutes. The resulting mixture was found to be 13.9 g/1000 g resin in isocyanate value. This value was taken as the initial isocyanate value. The mixture was subsequently reacted for about 4 hour while being maintained at 40° C. with stirring. When the isocyanate value decreased to 13.4 g/1000 g resin, 17.6 parts of methyl ethyl ketoxime was added to the mixture, followed by aging at 60° C. for 4 hours to obtain a self-crosslinking resin (I-(1)). The resin was a colorless transparent liquid, V in Gardner viscosity, 42% in solids content, 21.9 mg KOH/g resin in hydroxyl value, 3.4 g/1000 g resin in isocyanate value and 1.0 in NCO/OH (mole ratio). The resin was stored at 30° C. for 1 month, but no increase was found in its viscosity.

(4) Self-crosslinking coating composition (I-(1))

A coating composition was prepared from the following mixture.

| Self-crosslinking resin (I-(1)) | 238 parts |
| --- | --- |
| Titan White CR-93 | 80 parts |
| Tinuvin 900 | 1 part |
| Sanol LS292 | 0.5 part |
| Shin-Etsu Silicone X-24-943 | 0.005 part |
| Neostann U-200 | 0.5 part |
| Xylol | 20 parts |

(Note)
Titan White CR-93: titanium dioxide pigment, product of ISHIHARA SANGYO KABUSHIKI KAISHA.
Tinuvin 900: ultraviolet ray absorber, product of CIBA-GEIGY., LTD.
Sanol LS292: light stabilizer, product of SANKYO CO., LTD.
Shin-Etsu Silicone X-24-943: surface additive, product of SHIN-ETSU CHEMICAL CO., LTD.
Neostann U-200: curing catalyst, product of NITTO CHEMICAL CO., LTD.

EXAMPLE 2

(1) Preparation of vinyl polymer (A-2)

Xylene (65 parts) was placed into a reactor equipped with a stirrer, reflux condenser and thermometer, and was maintained at 130° C. by heating. The mixture 2 given below was added dropwise to the xylene over a period of 3 hours. Subsequently, a mixture of 35 parts of xylene and 1.0 part of tert-butylperoxyisopropyl carbonate was added dropwise to the resulting mixture over a period of 1 hour, followed by aging for 3 hours to obtain a vinyl polymer (A-2). The polymer had a solids content of 50% and was a colorless transparent liquid, D in Gardner viscosity, about 6000 in weight average molecular weight and 100 g/1000 g resin in isocyanate value.

| Mixture 2 | |
| --- | --- |
| m-Isopropenyl-α,α'-dimethylbenzyl isocyanate | 50 parts |
| n-Butyl acrylate | 30 parts |
| 2-Ethylhexyl acrylate | 20 parts |
| tert-Butylperoxyisopropyl carbonate | 4 parts |

(2) Hydroxyl-containing polyolefin resin (B-2)

Used as this resin was "40% Acrydick CL-146" (brand name, product of DAINIPPON INK & CHEMICALS INC., hydroxyl value 33 mg KOH/g resin, weight average molecular weight about 20000, solids content 40%) which is prepared by graft-polymerizing an acrylic monomer component comprising a hydroxyl-containing polymerizable monomer with a chlorinated polyolefin resin.

(3) Self-crosslinking resin (I-(2))

Into a reactor equipped with a stirrer, reflux condenser and thermometer were placed 200 parts of the vinyl polymer (A-2) and 1012.5 parts of the hydroxyl-containing polyolefin resin (B-2), which were then stirred at room temperature (25° C.) for 15 minutes. The resulting mixture was found to be 19.8 g/1000 g resin in isocyanate value (initial isocyanate value). The mixture was subsequently reacted for about 3 hours while being maintained at 40° C. with stirring. When the isocyanate value decreased to 19.1 g/1000 g resin, 22.0 parts of methylethyl ketoxime was added to the mixture, followed by aging at 60° C. for 2 hours to obtain a self-crosslinking resin (I-(2)). The resin was a colorless liquid, S in Gardner viscosity, 42.5% in solids content, 25.5 mg KOH/g resin in hydroxyl value, 19.1 g/1000 g resin in isocyanate value and 1.0 in NCO/OH (mole ratio). The resin was stored at 30° C. for 1 month, but no increase was found in its viscosity.

(4) Self-crosslinking coating composition (I-(2))

A coating composition was prepared from the following mixture.

| Self-crosslinking resin (I-(2)) | 235 parts |
| --- | --- |
| Titan White CR-93 | 80 parts |
| Tinuvin 900 | 1 part |
| Sanol LS292 | 0.5 part |
| Shin-Etsu Silicone X-24-943 | 0.005 part |
| Neostann U-200 | 0.5 part |
| Xylol | 20 parts |

EXAMPLE 3

(1) Preparation of vinyl polymer (A-3)

Xylene (65 parts) was placed into a reactor equipped with a stirrer, reflux condenser and the thermometer, and was maintained at 130° C. by heating. The mixture 3 given below was added dropwise to the xylene over a period of 3 hours. Subsequently, a mixture of 35 parts of xylene and 1.0 part of tert-butylperoxyisopropyl carbonate was added dropwise to the resulting mixture over a period of 1 hour, followed by aging for 3 hours to obtain a vinyl polymer (A-3). The polymer had a solids content of 50% and was a colorless transparent liquid, B in Gardner viscosity, about 6000 in weight average molecular weight and 120 g/1000 g resin in isocyanate value.

| Mixture 3 | |
| --- | --- |
| m-Isopropenyl-α,α'-dimethylbenzyl isocyanate | 60 parts |
| n-Butyl acrylate | 35 parts |
| 2-Ethylhexyl acrylate | 5 parts |
| tert-Butylperoxyisopropylcarbonate | 4 parts |

(2) Hydroxyl-containing polyolefin resin (B-3)

Used as this resin was "40% Acrydick BL-981" (brand name, product of DAINIPPON INK & CHEMICALS INC., hydroxyl value 22.5 mg KOH/g resin, weight average molecular weight about 20000, solids content 40%) which is prepared by graft-polymerizing an acrylic monomer component comprising a hydroxyl-containing polymerizable monomer with a chlorinated polyolefin resin.

(3) Self-crosslinking resin (II-(1))

Into a reactor equipped with a stirrer, reflux condenser and thermometer were placed 200 parts of the vinyl polymer (A-3) and 24.6 parts of methyl ethyl ketoxime, which were then aged at 60° C. for 2 hours to obtain a vinyl polymer (C-1) having both of a free isocyanate group and blocked isocyanate group in the molecule. To this polymer was added 1780 parts of the hydroxyl-containing polyolefin resin (B-3), and the mixture was reacted for about 6 hours while being maintained at 60° C. with stirring, followed by aging until no free isocyanate groups remained. Subsequently, 2.7 parts of methyl ethyl ketoxime was added to the reaction mixture to obtain a self-crosslinking resin (II-(1)). This resin was a slightly yellowish transparent liquid, U in Gardner viscosity, 41.7% in solids content, 19.2 mg KOH/g resin in hydroxyl value, 43.7 g/1000 g resin in isocyanate value and 1.0 in NCO/OH (mole ratio). The resin was stored at 30° C. for 1 month, but no increase was found in its viscosity.

(4) Self-crosslinking coating composition (II-(1))

A coating composition was prepared from the following mixture

| Self-crosslinking resin (II-(1)) | 240 parts |
| --- | --- |
| Titan White CR-93 | 80 parts |
| Tinuvin 900 | 1 part |
| Sanol LS292 | 0.5 part |
| Shin-Etsu Silicone X-24-943 | 0.005 part |
| Neostann U-200 | 0.5 part |
| xylol | 20 parts |

COMPARATIVE EXAMPLE 1

A two-pack coating composition (Z-1) was prepared from the following mixture.

| Main components | |
| --- | --- |
| Hydroxyl-containing polyolefin resin (B-1) | 234 parts |
| Titan White CR-93 | 80 parts |
| Tinuvin 900 | 1 part |
| Sanol LS292 | 0.5 part |
| Shin-Etsu Silicone X-24-943 | 0.005 part |
| Neostann U-200 | 0.05 part |
| Xylol | 20 parts |
| Curing agent | |
| Duranate 24A-75 | 8.7 parts |

(Note)
Duranate 24A-75: polyisocyanate, product of ASAHI CHEMICAL INDUSTRY CO., LTD.

COMPARATIVE EXAMPLE 2

A two-pack coating composition (Z-2) was prepared from the following mixture.

| Main components | |
| --- | --- |
| Hydroxyl-containing polyolefin resin (B-2) | 227 parts |
| Titan White CR-93 | 80 parts |
| Tinuvin 900 | 1 part |
| Sanol LS292 | 0.5 part |
| Shin-Etsu Silicon X-24-943 | 0.005 part |
| Neostann U-200 | 0.05 part |
| Xylol | 20 parts |
| Curing agent | |
| Duranate 24A-75 | 12.3 parts |

Results of Property Tests

The coating composition obtained in each of the foregoing examples and comparative examples was adjusted to a viscosity of Ford Cup #4, 18 seconds (20° C.) with xylol.

Coated test panels were prepared by degreasing a surface of each of soft polypropylene resin panels in the form of a strip measuring 15×7×0.2 cm with a vapor of trichloroethane for 1 minute, allowing the degreased panel to cool, then applying the coating composition adjusted in viscosity as above by spraying to a thickness of 40 μm as cured, allowing the panel to stand at room temperature for 10 minutes and thereafter curing the coating in a dryer at 100° C. for 40 minutes.

The test panels thus prepared were used to test the coating for properties.

(1) Result of storage stability test

The coating composition was stored in a closed container at 20° C. to determine the longest period of time (pot life) during which the composition retained such a viscosity that it was applicable by spraying. Table 1 shows the result.

TABLE 1

| | Example | | | Comp. Ex. | |
| --- | --- | --- | --- | --- | --- |
| | 1 | 2 | 3 | 1 | 2 |
| Pot life (hr.) | 240 | 240 | 240 | 3 | 3 |

(2) Result of coating property test

The cured coatings prepared by the above procedure were tested. Table 2 shows the result.

TABLE 2

| | | Example | | | Comp. Ex. | |
| --- | --- | --- | --- | --- | --- | --- |
| | | 1 | 2 | 3 | 1 | 2 |
| Gloss | 60° | 90 | 90 | 90 | 82 | 82 |
| | 20° | 84 | 84 | 84 | 72 | 72 |
| Distinctness-of-image gloss | | 1.0 | 1.0 | 1.0 | 0.8 | 0.8 |
| Adhesion | | Good | Good | Good | Good | Good |
| Pencil hardness | | 3B | 3B | 3B | 3B | 3B |
| Solvent resistance | | Good | Good | Good | Good | Good |
| Acid resistance | | Good | Good | Good | Good | Good |
| Alkali resistance | | Good | Good | Good | Good | Good |
| Gasoline resistance | | Good | Good | Good | Good | Good |
| Moisture resistance | | Good | Good | Good | Good | Good |
| Weather resistance | | 81 | 81 | 81 | 80 | 81 |
| Accelerated weathering resistance | | 80 | 81 | 80 | 80 | 80 |

Test methods

Gloss: The reflectivity (%) at an incidence angle of 60 deg or 20 deg was measured according to JIS K-5400, 60-deg specular reflective gloss.

Distinctness-of-image gloss: Determined by a distinctness-of-image gloss meter, "JCRI-GGD-166 Model Gd meter" (trade name of JAPAN COLOR RESEARCH INSTITUTE).

Adhesion: Cross cuts were formed in the coating with a knife through the entire thickness of the coating, an adhesive cellophane tape was affixed to the cut area and then forcibly peeled off, and the resulting coating was checked visually.

Pencil hardness: The coating surface was scratched with pencils for scratch testing at 20° C. to determine the hardest pencil causing no defacement.

Solvent resistance: The coating was rubbed with gauze wet with xylol 10 times and then visually evaluated.

Acid resistance: A 1 ml quantity of 0.1N sulfuric acid was applied dropwise to the coating, which was then allowed to stand at room temperature for 24 hours and thereafter evaluated visually.

Alkali resistance: A 1 ml quantity of 0.1N NaOH was applied dropwise to the coating, which was then allowed to stand at room temperature for 24 hours and thereafter evaluated visually.

Gasoline resistance: The test panel was immersed in regular gasoline at 20° C. for 4 hours, then allowed to stand as withdrawn from the gasoline for 2 hours and thereafter checked for the state of the coating.

Moisture resistance: The test panel was held in an atmosphere of 40° C. and humidity of at least 98% for 240 hours, then withdrawn from the atmosphere and visually checked for the state of the coating 2 hours after the withdrawal. The coating was subsequently tested for adhesion in the same manner as above.

Weather resistance: The coating was exposed to weather in Okinawa Prefecture for 12 months and thereafter checked for the reflectivity (%) at an incidence angle of 60 deg.

Accelerated weathering resistance: The coating was tested by a sunshine Weather-O-meter accelerated weathering tester for 500 hours and thereafter checked for the reflectivity (%) at an incidence angle of 60 deg.

We claim:

1. A coating resin composition consisting essentially of a self-crosslinking resin having at least one hydroxyl group and at least one blocked isocyanate group in the molecule, wherein the resin is prepared by reacting some of the free isocyanate groups of a vinyl polymer (A) having at least two free isocyanate groups in the molecule with some of the hydroxyl groups of a polyolefin resin (B) having at least two hydroxyl groups in the molecule, and subsequently reacting a blocking agent with the remaining free isocyanate groups.

2. A coating resin composition as defined in claim 1 wherein the vinyl polymer (A) is a polymer containing at least one isocyanate-containing vinyl monomer selected from among 2-isocyanate ethyl methacrylate, m-isopropenyl-α,α'-dimethylbenzyl isocyanate and equimolar adduct of 2-hydroxyethyl acrylate and isophorone diisocyanate.

3. A resin composition as defined in claim 1 wherein the self-crosslinking resin is about 1000 to about 120000 in weight average molecular weight.

4. A resin composition as defined in claim 1 wherein the self-crosslinking resin is about 25 to about 250 mg KOH/g resin in hydroxyl value and about 5 to about 250 g/1000 g resin in isocyanate value.

5. A coating resin composition consisting essentially of a self-crosslinking resin having at least one hydroxyl group and at least one blocked isocyanate group in the molecule, wherein the resin is prepared by reacting all free isocyanate groups of a vinyl polymer (C) having at least one free isocyanate group and at least one blocked isocyanate group in the molecule with some of the hydroxyl groups of a polyolefin resin (B) having at least two hydroxyl groups in the molecule.

6. A coating resin composition s defined in claim 5 wherein the vinyl polymer (C) is a partially blocked product of a polymer containing at least one isocyanate-containing vinyl monomer selected from among 2-isocyanate ethyl methacrylate, m-isopropenyl-$\alpha,\alpha'$-dimethylbenzyl isocyanate and equimolar adduct of 2-hydroxyethyl acrylate and isophorone diisocyanate.

7. A resin composition as defined in claim 5 wherein the self-crosslinking resin is about 1000 to about 120000 in weight average molecular weight.

8. A resin composition as defined in claim 5 wherein the self-crosslinking resin is about 25 to about 250 mg KOH/g resin in hydroxyl value and about 5 to about 250 g/1000 g resin in isocyanate value.

9. A resin composition as defined in claim 2, wherein said vinyl polymer (A) further comprises at least one other vinyl monomer.

10. A resin composition as defined in claim 6, wherein said vinyl polymer (C) further comprises at least one other vinyl monomer.

* * * * *